United States Patent [19]

Wonn

[11] 3,799,495
[45] Mar. 26, 1974

[54] FLUID CONTROL HAVING A BI-METAL ACTUATING MEMBER

[75] Inventor: Quinby E. Wonn, Plymouth, Mich.

[73] Assignee: General Motors Corporation, Detroit, Mich.

[22] Filed: Apr. 2, 1973

[21] Appl. No.: 347,129

[52] U.S. Cl.................... 251/11, 236/68 R, 236/87
[51] Int. Cl. ......................................... G05d 15/01
[58] Field of Search................ 236/68 R, 87; 251/11

[56] References Cited
UNITED STATES PATENTS

| | | | |
|---|---|---|---|
| 3,741,746 | 6/1973 | Travaglio | 236/87 |
| 3,239,189 | 3/1966 | Ray | 236/68 R |
| 2,748,223 | 5/1956 | Frank | 236/68 R |
| 3,414,010 | 12/1968 | Sparrow | 236/68 R |
| 3,685,732 | 8/1972 | Haskins et al. | 236/68 R |
| 3,750,999 | 8/1973 | Genbauffe | 236/68 R |

*Primary Examiner*—William E. Wayner
*Assistant Examiner*—William E. Tapolcai, Jr.
*Attorney, Agent, or Firm*—Donald F. Scherer

[57] ABSTRACT

A fluid control device for controlling fluid flow through a passage. The passage opening is controlled by deflection of a bi-metal strip which is heated by a rapid heating element for quick opening response and a slow heating element for maintaining the passage open. A compensating bi-metal strip provides ambient temperature compensation for the bi-metal strip and cooperates therewith to provide an electric switch to discontinue operation of the rapid heating element when the passage is opened. The flow of fluid through the passage provides a pressure signal for operating a fluid control valve.

3 Claims, 2 Drawing Figures

FLUID CONTROL HAVING A BI-METAL ACTUATING MEMBER

This invention relates to fluid controls and more particularly to fluid controls having a bi-metal actuating member.

In many fluid control systems it is desirable to provide a control device which may be selectively actuated to provide a control signal within the control system. Automatic multi-ratio transmissions for vehicles, use such devices. For example, the detent or wide open throttle downshift control quite often utilizes a solenoid controlled valve, which is actuated by an operator controlled switch to provide a forced downshift in the transmission. Control devices of the general nature of the subject invention are also utilized in the vacuum advanced system of an internal engine to control the engine vacuum which is directed to the vacuum advance of the engine distributor, thereby permitting the vacuum advance to be selectively utilized during certain situations, such as cold engine start. It is also desirable in many fluid control systems to provide a time delay during which selective portions of the control may be rendered active or inactive through the use of a selectively controlled actuating signal.

The present invention provides an apparatus which may be incorporated in a fluid control system to provide selective or pilot operation for valve members in the control system. This is accomplished through the control of fluid flow, and thereby fluid pressure. The fluid flow is controlled by a bi-metal strip which may be selectively heated to cause the bi-metal strip to deflect. The deflection of the bi-metal strip is utilized to control flow through a passage.

The present invention incorporates two resistance heating coils surrounding a bi-metal strip, one of which heating coils provides rapid heating to induce quick opening of the controlled fluid passage; while the other heating coil generates heat slowly in an amount sufficient to maintain the bi-metal strip in the deflected position. Also incorporated in the present invention is a compensating bi-metal strip which responds to ambient temperature conditions such that heated bi-metal strip will respond in substantially constant time regardless of the ambient temperature conditions. Electrical contacts are disposed on the compensating bi-metal strip and the heated bi-metal strip such that, after a predetermined deflection of the heated bi-metal strip, the electrical contacts will open thereby discontinuing current flow through the rapid heating coil. The length of time required to heat the bi-metal strip can be controlled by controlling the heating characteristic of the rapid heating coil and/or the thermal response characteristic of the bi-metal strip.

It is an object of this invention to provide an improved fluid control wherein a bi-metal strip is utilized to control fluid flow.

It is another object of this invention to provide an improved fluid control device in which fluid flow is controlled by a bi-metal strip which is initially rapidly heated to initiated fluid flow control and is then slowly maintained at temperature to continue fluid flow control.

Another object of this invention is to provide in an improved fluid control device and which fluid flow is controlled in a passage by a bi-metal strip which is selectively heated and in which a compensating bi-metal strip cooperates with the aforementioned bi-metal strip to provide constant response of the bi-metal strip with ambient temperature changes.

These and other objects and advantages of the present invention will be more apparent from the following description and drawings in which.

Figure 1:
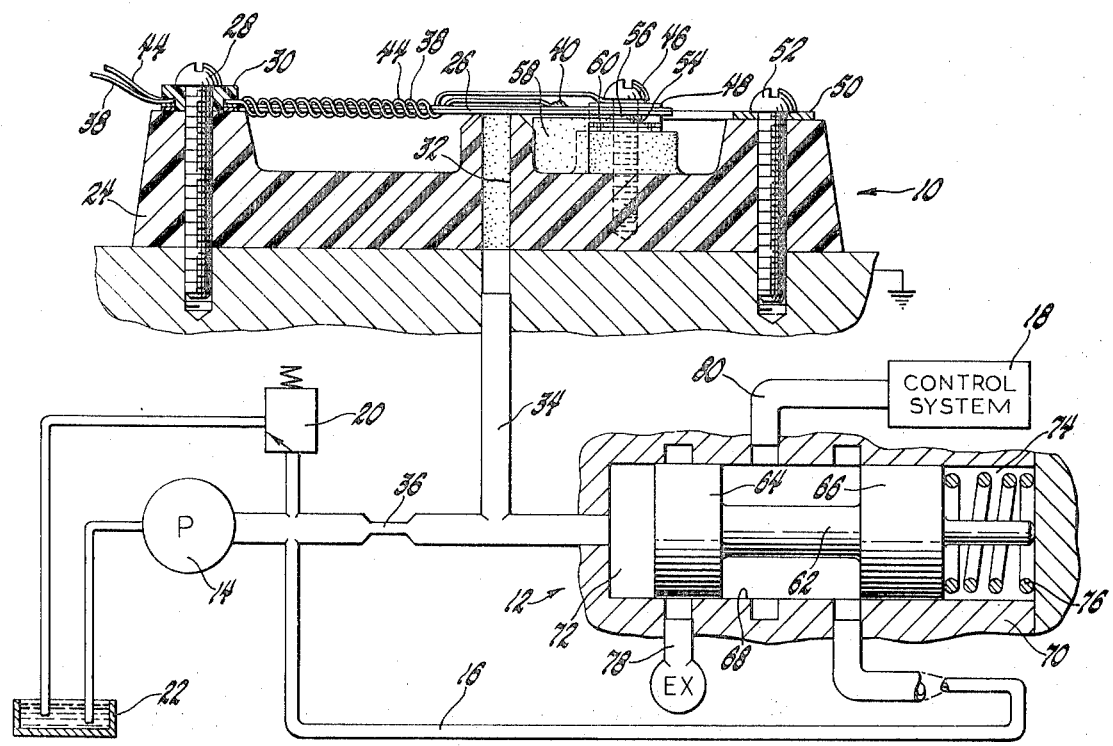
FIG. 1 is a sectional elevational view of the preferred embodiment.
Figure 2:
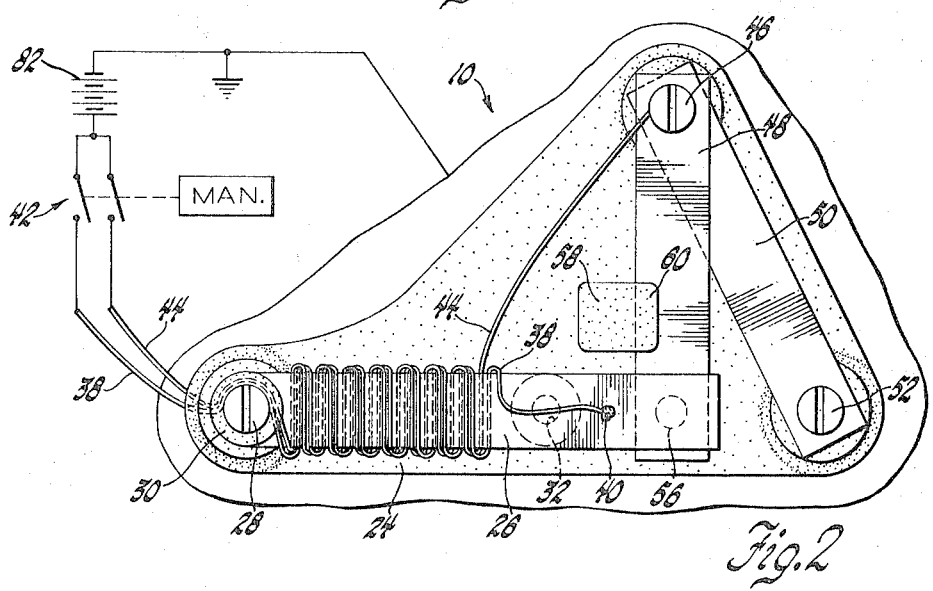
FIG. 2 is a top plan view of the preferred embodiment.

Referring to the drawings wherein like characteristics designate the same or corresponding parts there is shown a bi-metal actuated fluid control device 10 which controls fluid pressure for a pilot operated control valve 12. The pilot operated control valve 12 functions to control fluid delivered from a pump 14 via passage 16 to a control system 18. The control system 18, may be any of the commonly used automatic transmission control systems. The fluid pressure in passage 16 is controlled by a conventional pressure regulator valve 20 which exhausts excess fluid delivered by the pump 14 to a reservoir 22.

The bi-metal actuated fluid control device 10 includes a base member 24 on which is secured a bi-metal strip 26 by a threaded fastener 28. The bi-metal strip 26 is electrically insulated from the fastener 28 by a non conducting member 30. A passage 32 is formed in the base member 10, which passage is in fluid communication, through a passage 34 and a restriction 36, with the passage 16. The bi-metal strip 26 is arranged such that, in the inoperative position shown, the fluid passage 32 is closed thereby maintaining the fluid pressure in passage 34 substantially equal to the fluid pressure in passage 16.

The bi-metal strip 26 has a rapid heating coil 38 circumjacent a portion thereof, which rapid heating coil 38 is soldered or otherwise electrically secured to the bi-metal strip 26 at one end 40. The other end of rapid heating coil 38 is connected to a conventional manually operated electrical switch, generally designated 42. Also disposed circumjacent the same portion of the bi-metal strip 26 is a slow heating coil 44, one end of which is secured to the electrical switch 42 and the other end of which is secured to a fastener 46.

The fastener 46 is threadably secured to the base 24 and, is also utilized to secure a compensating bi-metal strip 48 and a ground strap 50 to the base 24. The ground strap 50 is connected to ground through a fastener 52. The compensating bi-metal strip 48 extends perpendicular to the bi-metal strip 26 and has formed thereon an electrical contact 54 which cooperates with an electric contact 56, secured to the bi-metal strip 26, to form an electrical switch between the bi-metal strips 26 and 48. A stop member 58 is formed integrally with or otherwise secured to the base member 24, which stop member 58 has a portion 60 extending above the compensating bi-metal strip 48 to limit the upward movement of the compensating strip 48.

The pilot operated control valve 12 includes a valve spool 62 having spaced equal diameter lands 64 and 66 which are slidably disposed in a valve bore 68 formed in a valve body 70. The valve bore 68 cooperates with valve land 64 to form a pilot control chamber 72 at one end of valve bore 68, and a spring chamber 74 is formed by valve land 66 and bore 68 at the other end of bore 68. A compression spring 76 is disposed between valve land 66 and one end of valve bore 68 to urge the valve 62 toward the left end of valve bore 68, as seen in FIG. 1. The valve bore 68 is in fluid communication with passage 16, an exhaust passage 78, and a control system passage 80. The control system passage 80 is in fluid communication with the fluid control system 18.

As shown in FIG. 1 the passage 32 is closed by the bi-metal strip 26 thereby causing the development of fluid pressure in chamber 72 such that the valve spool 62 is moved to the right. With the valve spool 62 moved to the right as shown, fluid pressure in pump 14 is delivered via passage 16 between lands 64 and 66 to passage 80 and the control system 18. Thus in the position shown fluid pressure is available at the control system 18 to provide whatever system function such as detent downshift, is desired. To discontinue the fluid pressure in passage 80, the electrical switch 42 is closed thereby connecting the heating coils 38 and 44 to an electrical source 82, such as a storage battery. When the electrical switch 42 is closed electrical current will flow through the heating coils 38 and 44. Heating coil 38 is designed to rapidly heat the bi-metal strip 26 such that, when viewed in FIG. 1, upward deflection of the bi-metal strip 26 will occur. As the bi-metal strip 26 deflects upwardly fluid pressure in passage 34 is exhausted, thereby relieving the fluid pressure in the pilot control chamber 72. as the pressure in the pilot control chamber 72 diminishes the spring 76 will move the valve spool 62 to the left such that valve land 66 will discontinue fluid communication between passage 16 and passage 80, while valve land 64 will open fluid communication between passage 80 and exhaust passage 78. As the bi-metal strip 26 deflects upwardly, upward movement of the compensating bi-metal strip 48 will also occur. However, the upward deflection of the compensating bi-metal strip 48 is limited by the stop member 58. When the compensating bi-metal strip 48 is limited by the stop member 68, further upward deflection of the bi-metal strip 26 will result in opening of the electrical contacts 54 and 56. When the contacts 54 and 56 have opened, current flow will cease in the rapid heating coil 38. The bi-metal strip 26 will then be maintained in its upward deflected position by the heat generated in the heat coil 44 until the electrical switch 42 is opened.

The compensating bi-metal strip 48 is designed such that it provides an upward force on the bi-metal strip 26 tending to open the passage 32. As the ambient temperature conditions change, the compensating bi-metal strip responds thereto thereby changing the upward force supplied thereby to the bi-metal strip 26. As the ambient temperature increases, the force imposed by the compensating bi-metal strip 48 on the bi-metal strip 26 will decrease. However, since the bi-metal strip 26 is also affected by ambient conditions the time necessary to deflect the bi-metal strip 26 upwardly, when the rapid heating coil 38 is energized, remains constant. If the ambient temperature should decrease the bi-metal strip 48 would impose a higher force on the bi-metal strip 26.

While the foregoing embodiment is described as being incorporated in a positive fluid pressure system it is not limited to such systems. Bi-metal actuated devices, of the type described, can also be utilized in negative pressure or vacuum systems. It will also be obvious to persons skilled in the art that the pilot operated control valve 12 can also be changed such that the control system 18 is exhausted when passage 32 is closed and is actuated when passage 32 is opened. This of course can be readily accomplished by interchanging the connections of passages 16 and 78 on the valve bore 68.

Obviously, many modifications and variations of the present invention are possible in light of the above teachings. It is, therefore, to be understood that within the scope of the appended claims the invention may be practiced otherwise than as specifically described.

What is claimed is:

1. A bi-metal actuated fluid control device comprising, a base member; a fluid passage in said base member; bi-metal strip means secured to said base member and having a portion adjacent said fluid passage for controlling fluid flow through said fluid passage; electric switch means operatively connected to said bi-metal strip means for conducting electric current when said switch means is closed; first selectively operable electrical heat generating means circumjacent a portion of said bi-metal strip means and being operatively connected with said electric switch means for rapidly heating said bi-metal strip means when said electric switch means is closed and being inoperable when said electric switch means is open; and second selectively operable electrical heat generating means circumjacent the same portion of said bi-metal strip means for selectively maintaining said bi-metal strip means heated when said electric switch means is open; said bi-metal strip means deflecting in response to heating by said first and second electrical heat generating means to control fluid flow through said fluid passage; and said electric switch means being opened by deflection of said bi-metal strip means after a predetermined deflection has occurred.

2. A bi-metal actuated fluid control device comprising, a base member; a fluid passage in said base member; bi-metal strip means secured to said base member and having a portion adjacent said fluid passage for controlling fluid flow through said fluid passage; a compensating bi-metal strip secured to said base member; electric switch means on said bi-metal strip means and said compensating strip for conducting electric current when said switch means is closed; first selectively operable heat generating means circumjacent a portion of said bi-metal strip means for rapidly heating said bi-metal strip means when said electric switch means is closed and being inoperable when said electric switch means is open; and second selectively operable heat generating means circumjacent the same portion of said bi-metal strip means for selectively maintaining said bi-metal strip means heated when said electric switch means is opened; said bi-metal strip means deflecting in response to heating by said first and second heat generating means to control fluid flow through said fluid passage; and said electric switch means being opened by deflection of said bi-metal strip means after a predetermined deflection has occurred.

3. A bi-metal actuated fluid control device comprising, a fluid source; fluid restriction means in fluid communication with said source; a base member; a fluid passage in said base member and being in fluid communication with said source downstream of said restriction means; bi-metal strip means secured to said base member and having a portion adjacent said fluid passage for controlling fluid flow through said fluid passage; a compensating bi-metal strip secured to said base member; electric switch means on said bi-metal strip means and said compensating strip for conducting electric current when said switch is closed; first selectively operable heat generating means circumjacent a portion of said bi-metal strip means for rapidly heating said bi-metal strip means when said electric switch means is closed and being inoperable when said electric switch means is open; second selectively operable heat generating means circumjacent the same portion of said bi-metal strip means for selectively maintaining said bi-metal strip means heated when said electric switch means is opened; said bi-metal strip means deflecting in response to heating of said first and second heat generating means to control fluid flow through said fluid passage, and said electric switch means being opened by deflection of said bi-metal strip means after a predetermined deflection has occurred; and pilot operated valve means including control chamber means in fluid communication with said fluid passage for controlling operation of said pilot operated valve means in response to deflection of said bi-metal strip means, a valve bore in fluid communication with said source upstream of said restriction means, and valve spool means slidably disposed in said valve bore and being responsive to fluid pressure in said control chamber means for directing fluid pressure from said source.

* * * * *